US009058558B2

(12) United States Patent
Nagatomi

(10) Patent No.: US 9,058,558 B2
(45) Date of Patent: Jun. 16, 2015

(54) IMAGE PROCESSING APPARATUS AND COMPUTER PROGRAM PRODUCT FOR PERFORMING A DRAWING PROCESS TO ADD A COLOR AND A BACKGROUND COLOR OF A SPOT COLOR IMAGE BASED IN PART ON COLOR TRANSPARENCY INFORMATION

(71) Applicant: FUJI XEROX CO., LTD., Tokyo (JP)

(72) Inventor: Teppei Nagatomi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/320,882

(22) Filed: Jul. 1, 2014

(65) Prior Publication Data

US 2015/0029522 A1    Jan. 29, 2015

(30) Foreign Application Priority Data

Jul. 25, 2013 (JP) ................. 2013-154434

(51) Int. Cl.
*H04N 1/54* (2006.01)
*G06K 15/02* (2006.01)
(52) U.S. Cl.
CPC .............. *G06K 15/1878* (2013.01); *H04N 1/54* (2013.01)
(58) Field of Classification Search
None
See application file for complete search history.

(56) References Cited

U.S. PATENT DOCUMENTS

| 7,054,031 | B2* | 5/2006 | Lee et al. ................ 358/1.9 |
| 7,430,069 | B2* | 9/2008 | Furukawa ................ 358/518 |
| 7,692,831 | B2* | 4/2010 | Nishikawa ................ 358/518 |
| 7,990,574 | B2* | 8/2011 | Cairns ................... 358/1.9 |
| 8,259,349 | B2* | 9/2012 | Cairns ................... 358/1.9 |
| 8,437,055 | B2* | 5/2013 | Ishizuka et al. ............ 358/530 |
| 2004/0080765 | A1 | 4/2004 | Nishide et al. |

FOREIGN PATENT DOCUMENTS

| JP | 2002-223363 A | 8/2002 |
| JP | 2004-148535 A | 5/2004 |

* cited by examiner

*Primary Examiner* — Scott A Rogers
(74) *Attorney, Agent, or Firm* — Sughrue Mion, PLLC

(57) ABSTRACT

An image processing apparatus includes a reception unit, an intermediate data generation unit, an extraction unit, a conversion unit, an addition unit, a determination unit, and a drawing processing unit. In the case where the determination unit determines that intermediate data for spot color image data have background image data, the drawing processing unit performs a drawing process so as to add a color of spot color image data and a color of the background image data of the spot color image data on the basis of color transparency information added by the addition unit, color information on spot color image data converted by the conversion unit, and color information on the background image data.

6 Claims, 10 Drawing Sheets

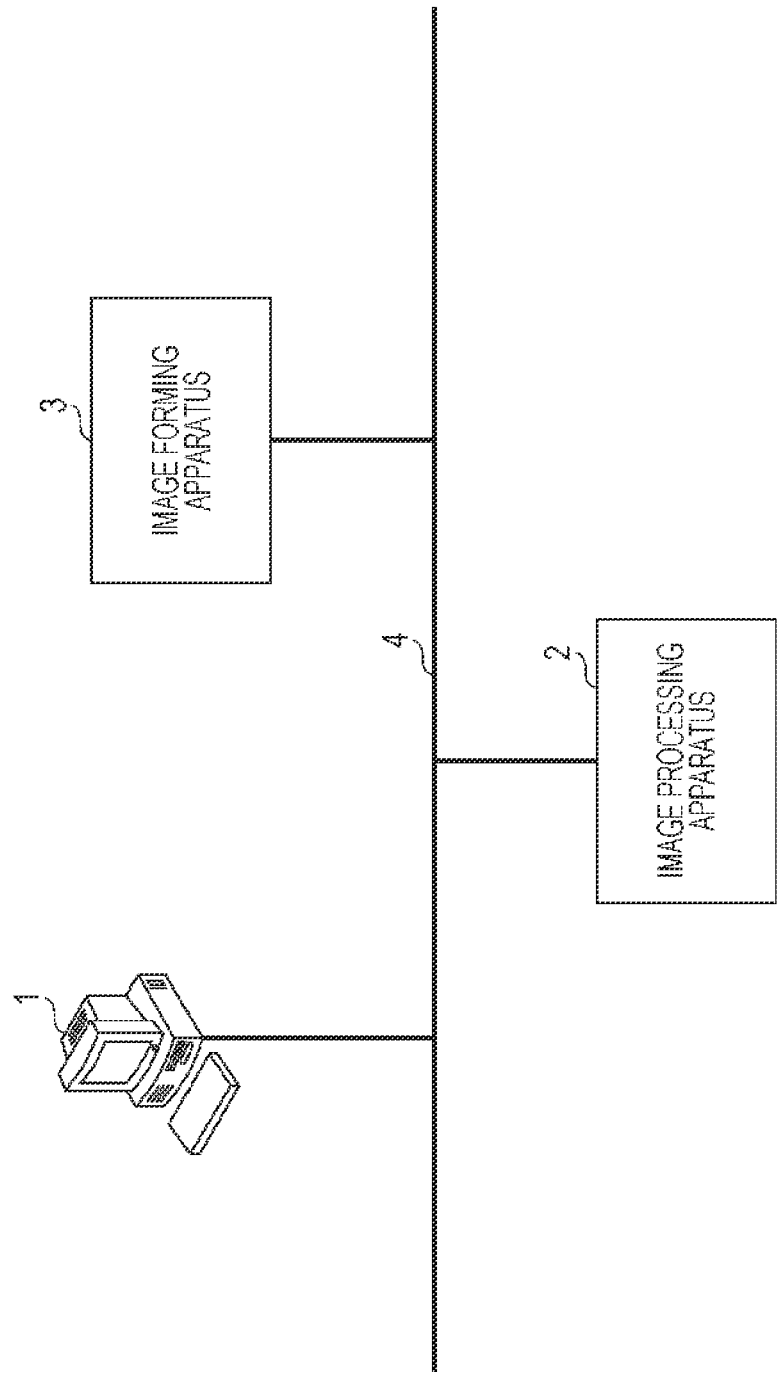

101  102

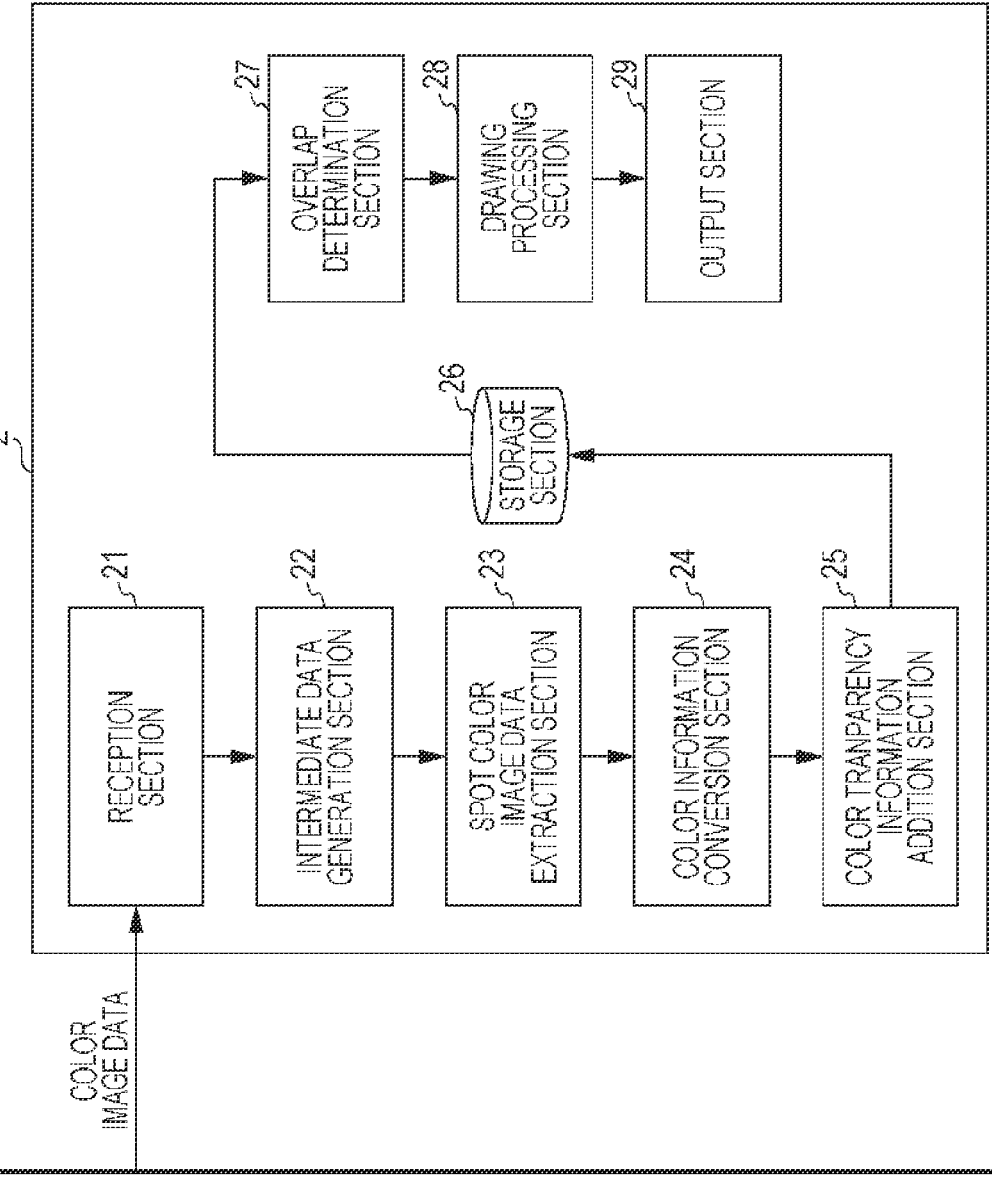

FIG. 5A

| CYAN | MAGENTA | YELLOW | BLACK |
|---|---|---|---|
| 0 | 255 | 0 | 0 |

FIG. 5B

| CYAN | MAGENTA | YELLOW | BLACK |
|---|---|---|---|
| 90 | 114 | 140 | 63 |

FIG. 5C

| TRANSPARENT | SEMI-TRANSPARENT | NON-TRANSPARENT |
|---|---|---|
| 0 | 128 | 255 |

FIG. 9
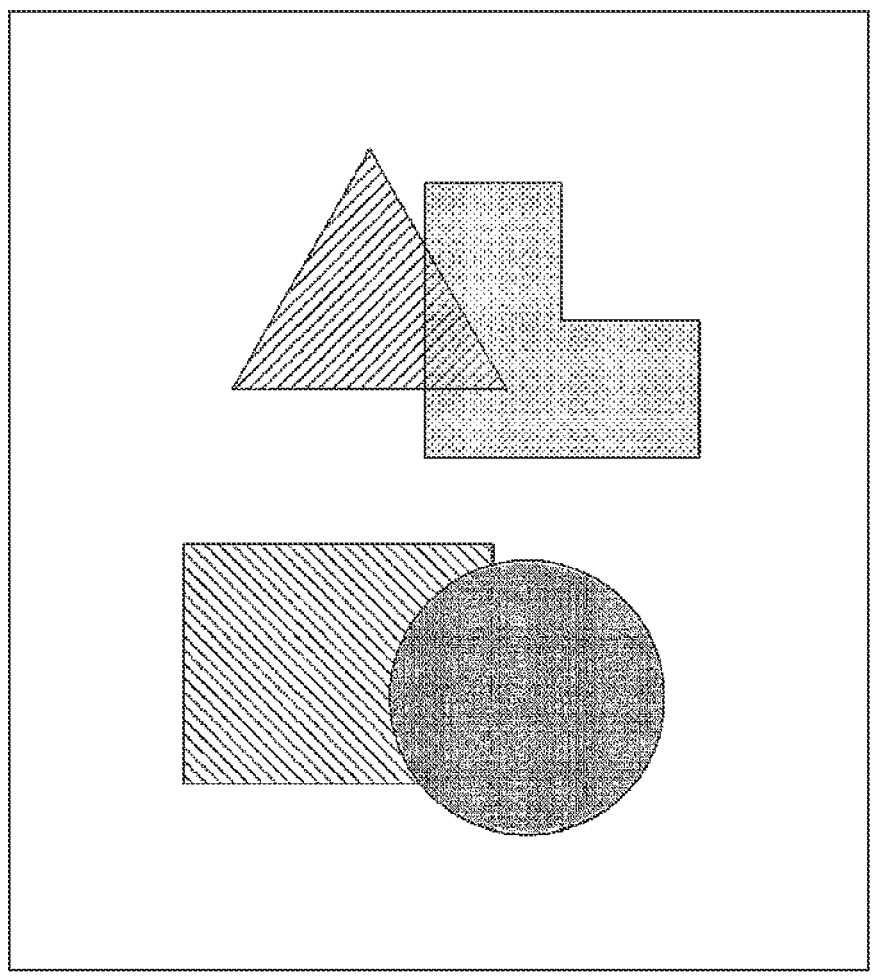
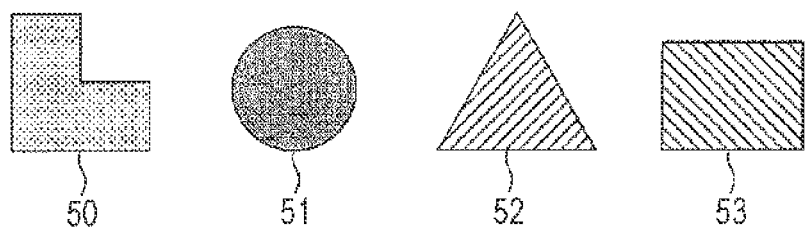

FIG. 10

| COLOR INFORMATION | CYAN | MAGENTA | YELLOW | BLACK | COLOR TRANPARENCY INFORMATION |
|---|---|---|---|---|---|
| FIRST SPOT COLOR IMAGE | 90 | 114 | 140 | 63 | SEMI-TRANSPARENT |
| SECOND SPOT COLOR IMAGE | 60 | 160 | 70 | 50 | NON-TRANSPARENT |
| CYAN IMAGE | 255 | 0 | 0 | 0 | |
| MAGENTA IMAGE | 0 | 255 | 0 | 0 | |

FIG. 11

| COLOR INFORMATION | CYAN | MAGENTA | YELLOW | BLACK |
|---|---|---|---|---|
| REGION OF FIRST SPOT COLOR IMAGE AND CYAN IMAGE | 255 | 114 | 140 | 63 |
| REGION OF SECOND SPOT COLOR IMAGE AND MAGENTA IMAGE | 60 | 160 | 70 | 50 |

_US 9,058,558 B2_

IMAGE PROCESSING APPARATUS AND COMPUTER PROGRAM PRODUCT FOR PERFORMING A DRAWING PROCESS TO ADD A COLOR AND A BACKGROUND COLOR OF A SPOT COLOR IMAGE BASED IN PART ON COLOR TRANSPARENCY INFORMATION

CROSS-REFERENCE TO RELATED APPLICATIONS

This application is based on and claims priority under 35 USC 119 from Japanese Patent Application No. 2013-154434 filed Jul. 25, 2013.

BACKGROUND

Technical Field

The present invention relates to an image processing apparatus, an image forming apparatus, and a recording medium.

SUMMARY

According to an aspect of the present invention, there is provided an image processing apparatus including: a reception unit that receives color image data composed of process color image data, which are image data represented in process colors, and spot color image data, which are image data represented in spot colors that are different from the process colors; an intermediate data generation unit that generates intermediate data including color information indicating a color of each image data on the basis of the color image data received by the reception unit; an extraction unit that extracts spot color image data from the intermediate data generated by the intermediate data generation unit; a conversion unit that converts color information on the spot color image data extracted by the extraction unit into color information represented in the process colors; an addition unit that adds color transparency information indicating a proportion of a color to a color of image data in a background to the color information on the spot color image data converted by the conversion unit; a determination unit that determines whether or not the intermediate data generated by the intermediate data generation unit for each image data have background image data, which are other image data provided in the background to overlap the image data; and a drawing processing unit that performs a drawing process on the basis of the intermediate data, the color information on the spot color image data converted by the conversion unit, and the color transparency information added by the addition unit, in which in the case where the determination unit determines that the intermediate data for spot color image data have background image data, the drawing processing unit performs a drawing process so as to add a color of the spot color image data and a color of the background image data of the spot color image data on the basis of the color transparency information added by the addition unit, the color information on the spot color image data converted by the conversion unit, and the color information on the background image data.

BRIEF DESCRIPTION OF THE DRAWINGS

An exemplary embodiment of the present invention will be described in detail based on the following figures, wherein:

FIG. 1 illustrates an image forming system according to an exemplary embodiment of the present invention;

FIG. 4 is a block diagram illustrating the functional configuration of the image processing apparatus 2 according to the exemplary embodiment of the present invention;

FIGS. 5A to 5C illustrate examples of color information and color transparency information according to the exemplary embodiment of the present invention;

FIG. 9 illustrates an example of the color image data according to the exemplary embodiment of the present invention;

FIG. 10 illustrates an example of the color information and the color transparency information for each image data included in the color image data according to the exemplary embodiment of the present invention; and FIG. 11 illustrates an example of colors in regions in which images overlap each other according to the exemplary embodiment of the present invention.

DETAILED DESCRIPTION

Now, an exemplary embodiment of the present invention will be described in detail below with reference to the drawings.

FIG. 1 illustrates an image forming system according to an exemplary embodiment of the present invention.

As illustrated in FIG. 1, the image forming system according to the exemplary embodiment includes a terminal apparatus 1 that prepares color image data, an image processing apparatus 2 such as a print server that simulates color image data, and an image forming apparatus 3 that has inks for cyan (C), magenta (M), yellow (Y), and black (K) as process colors and spot color inks for colors that are different form the process colors. The terminal apparatus 1, the image processing apparatus 2, and the image forming apparatus 3 are connected to each other via a network 4.

The terminal apparatus 1 prepares color image data to be overprinted by the image forming apparatus 3. The color image data prepared by the terminal apparatus 1 include process color image data which are image data represented in the process colors, and spot color image data which are image data represented using the spot color inks of the image forming apparatus 3.

The image processing apparatus 2 outputs the color image data prepared by the terminal apparatus 1 to a display device or paper (not illustrated) using only the process colors to simulate the color image data using the process colors.

The image forming apparatus 3 outputs the color image data prepared by the terminal apparatus 1 to paper.

Figure 2A:
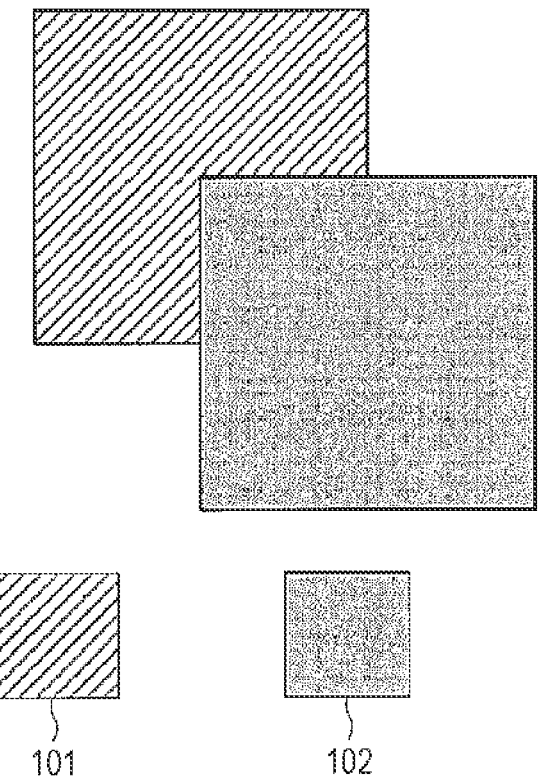
FIGS. 2A and 2B illustrate a specific overprinting method.
Figure 2B:
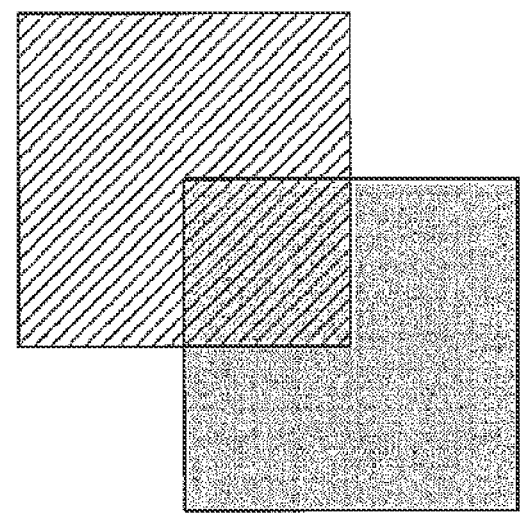

The term "overprinting" refers to a printing method in which a background image 101 and a foreground image 102 are output to paper with the images 101 and 102 overlapping each other, for example, as illustrated in FIGS. 2A and 2B. In the case where an ink that is not optically transparent is used for the foreground image 102, a region of the background image 101 overlapping the foreground image 102 is hidden by the color of the foreground image 102 in the image output to paper as illustrated in FIG. 2A. In the case where an ink that is optically transparent is used for the foreground image 102, a region in which the background image 101 and the foreground image 102 overlap each other has a color obtained by adding the color of the background image 101 and the color of the foreground image 102 in accordance with the optical transparency of the spot color of the foreground image 102 in the image output to paper as illustrated in FIG. 2B.

Next, the hardware configuration of the image processing apparatus 2 according to the exemplary embodiment will be described with reference to FIG. 3.

Figure 3:
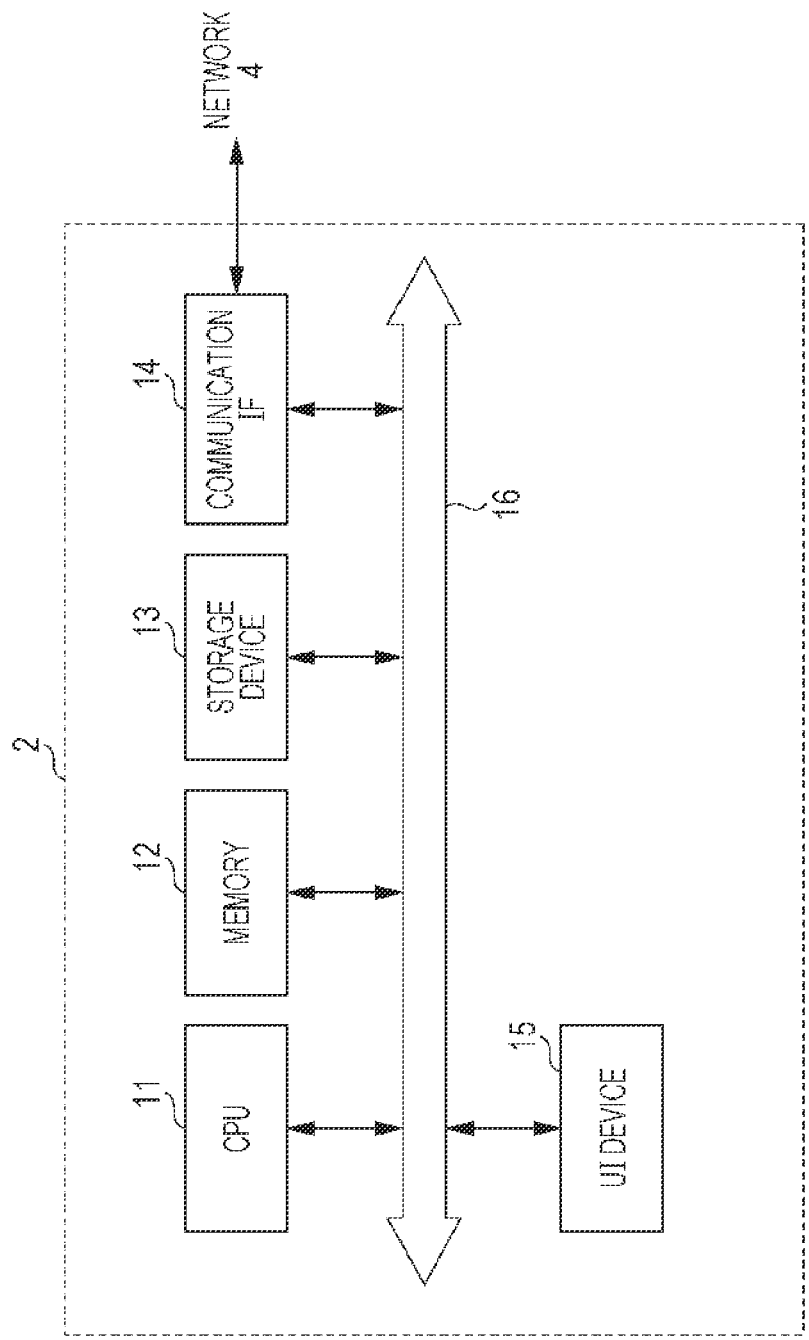
FIG. 3 is a block diagram illustrating the hardware configuration of an image processing apparatus 2 according to the exemplary embodiment of the present invention.

As illustrated in FIG. 3, the image processing apparatus 2 includes a central processing unit (CPU) 11, a memory 12, a storage device 13 such as a hard disk drive (HDD), a communication interface (IF) 14 that transmits and receives data to and from an external device or the like via the network 4, and a user interface (UI) device 15 that includes a touch panel or a liquid crystal display. Such components are connected to each other via a control bus 16.

The CPU 11 controls operation of the image processing apparatus 2 by executing a predetermined process on the basis of a control program stored in the memory 12 or the storage device 13. In the exemplary embodiment, the CPU 11 reads and executes a control program stored in the memory 12 or the storage device 13. However, such a program may be stored in a storage medium such as a CD-ROM to be provided to the CPU 11.

FIG. 4 is a block diagram illustrating the functional configuration of the image processing apparatus 2 implemented by executing the control program described above.

As illustrated in FIG. 4, the image processing apparatus 2 includes a reception section 21, an intermediate data generation section 22, a spot color image data extraction section 23, a color information conversion section 24, a color transparency information addition section 25, a storage section 26, an overlap determination section 27, a drawing processing section 28, and an output section 29.

The reception section 21 receives color image data composed of process color image data, which are image data represented in the process colors, and spot color image data, which are image data represented in spot colors that are different from the process colors, from the terminal apparatus 1 via the network 4.

The intermediate data generation section 22 generates intermediate data on the basis of the color image data received by the reception section 21. The intermediate data include color information indicating the color of each image data, and shape information indicating a region decided by the shape of each image data.

The spot color image data extraction section 23 extracts spot color image data from the intermediate data generated by the intermediate data generation section 22.

The color information conversion section 24 converts color information on the spot color image data extracted by the spot color image data extraction section 23 into color information represented in the process colors.

In the case where the color information on the spot color image data indicates an even color in the region indicated by the shape information, the color information conversion section 24 converts the color information on the spot color image data such that the even color is represented by the process colors. In the case where the color information on the spot color image data indicates plural colors in the region indicated by the shape information, meanwhile, the color information conversion section 24 converts the color information on the spot color image data such that each pixel in the region indicated by the shape information on the spot color image data is represented by the process colors. Examples of the case where the color information on the spot color image data indicates plural colors in the region indicated by the shape information include a case where gradations are formed in the region of the image data.

The color transparency information addition section 25 adds color transparency information indicating the proportion of a color to the color of image data in the background to the color information on the spot color image data converted by the color information conversion section 24. In the exemplary embodiment, the color transparency information added by the color transparency information addition section 25 is described as information in which the optically transparency of the spot colors is specified by setting the proportion of a color to the color of the background image data and which is transmitted from the terminal apparatus 1 as the color transparency information. However, the color transparency information may be set by a printer server (not illustrated) or the image processing apparatus 2. In the exemplary embodiment, the proportion of the color of the background image data to the color of the foreground image data is described as being constant (at 255) at all times. However, the terminal apparatus 1 may specify information indicating the proportion of the color of the background image data to the color of the foreground image data so that such information is included in the color transparency information.

In the exemplary embodiment, in addition, the color information on the spot color image data which has been converted by the color information conversion section 24 and to which the color transparency information has been added by the color transparency information addition section 25 is referred to as "converted color information".

The storage section 26 stores intermediate data including the converted color information.

The overlap determination section 27 determines whether or not the intermediate data stored in the storage section 26 for each image data have background image data, which are other image data in the background to overlap the image data.

The drawing processing section 28 performs a drawing process on the basis of the intermediate data and the converted color information.

Specifically, in the case where the overlap determination section 27 determines that the intermediate data the image data for spot color image data have background image data, the drawing processing section 28 performs a drawing process so as to add the color of the spot color image data and the color of the background image data on the basis of the converted color information on the spot color image data, the color information on the background image data, and the shape information on both the spot color image data and the background image data. If the overlap determination section 27 determines that the intermediate data for image data do not have background image data, the drawing processing section 28 performs a drawing process on such image data on the basis of the color information and the shape information on each image data.

In the case where the overlap determination section 27 determines that the intermediate data for process color image data have background image data, meanwhile, the drawing processing section 28 performs a drawing process in accordance with whether or not overprinting is specified. Specifically, in the case where overprinting is not specified, the drawing processing section 28 performs a drawing process such that a region of the background image data that overlaps the process color image data is hidden by the color of the process color image data. In the case where overprinting is specified, meanwhile, the drawing processing section 28 performs a drawing process on the basis of the color information on the process color image data, the color information on the background image data, and the shape information on both the process color image data and the background image data.

In the exemplary embodiment, in addition, in the case where the overlap determination section 27 determines that the intermediate data for image data have background image data and a drawing process is performed on such image data, the drawing processing section 28 performs a drawing process for each pixel of the region including the image data and the background image data.

The output section 29 outputs an image on which a drawing process has been performed by the drawing processing section 28 to a display device or paper (not illustrated).

Next, examples of the color information and the color transparency information according to the exemplary embodiment will be described with reference to FIGS. 5A to 5C.

FIG. 5A illustrates the color information on the process color image data. FIG. 5B illustrates the color information on the spot color image data converted by the color information conversion section 24 so as to be represented in the process colors. As illustrated in FIGS. 5A and 5B, the color information according to the exemplary embodiment represents the color of each image data with the density of each of the cyan, magenta, yellow, and black colors specified in the range of values of 0 to 255.

FIG. 5C illustrates the color transparency information to be added by the color transparency information addition section 25 to the spot color image data converted by the color information conversion section 24. As illustrated in FIG. 5C, the terminal apparatus 1 specifies the color transparency information according to the exemplary embodiment as "transparent", "semi-transparent", and "non-transparent" through an operation or the like by a user, and values of 0, 128, and 255 are set to the specified items, respectively. The drawing processing section 28 determines the color of a region in which image data overlap each other on the basis of the color information and the shape information on the spot color image data, the color information and the shape information on the background image data, and the color transparency information.

In the case where "transparent" is specified in the color transparency information, the color of the spot color image data to which the color transparency information is added is not represented, and the color of the background image data is represented in the region in which the spot color image data overlaps the background image data. That is, in the case where the color transparency information is "transparent", it is indicated that the proportion of the color of the spot color image data to the color of the background image data is 0:1.

In the case where "non-transparent" is specified in the color transparency information, the spot color image data to which the color transparency information is added is drawn so as to hide the color of the background image data. That is, in the case where the color transparency information is "non-transparent", it is indicated that the proportion of the color of the spot color image data to the color of the background image data is 1:0.

In the case where "semi-transparent" is specified in the color transparency information, a color obtained by adding the color of the spot color image data and the color of the background image data is represented in the region in which the spot color image data to which the color transparency information is added and the background image data overlap each other. That is, in the case where the color transparency information is "semi-transparent", it is indicated that the proportion of the color of the spot color image data to the color of the background image data is 1:1.

Figure 6:
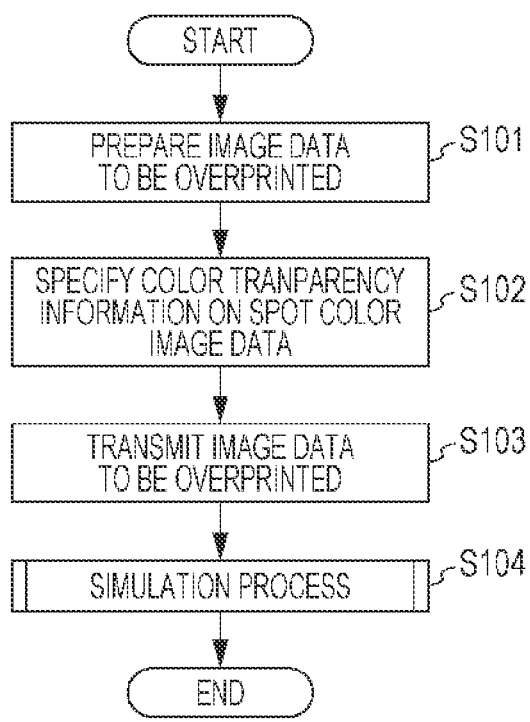
FIG. 6 is a flowchart illustrating the overall process performed by the image forming system according to the exemplary embodiment of the present invention.

Next, the overall process performed by the image forming system according to the exemplary embodiment will be described with reference to the flowchart illustrated in FIG. 6.

First, the terminal apparatus 1 prepares color image data to be overprinted by the image forming apparatus 3 (step S101).

Next, the terminal apparatus 1 specifies color transparency information on spot color image data included in the prepared color image data through an operation or the like by the user (step S102).

Then, the terminal apparatus 1 transmits the color image data and the specified color transparency information to the image processing apparatus 2 via the network 4 (step S103).

Then, the image processing apparatus 2 performs a process for simulating the color image data to be overprinted using the process colors (step S104).

Figure 7:
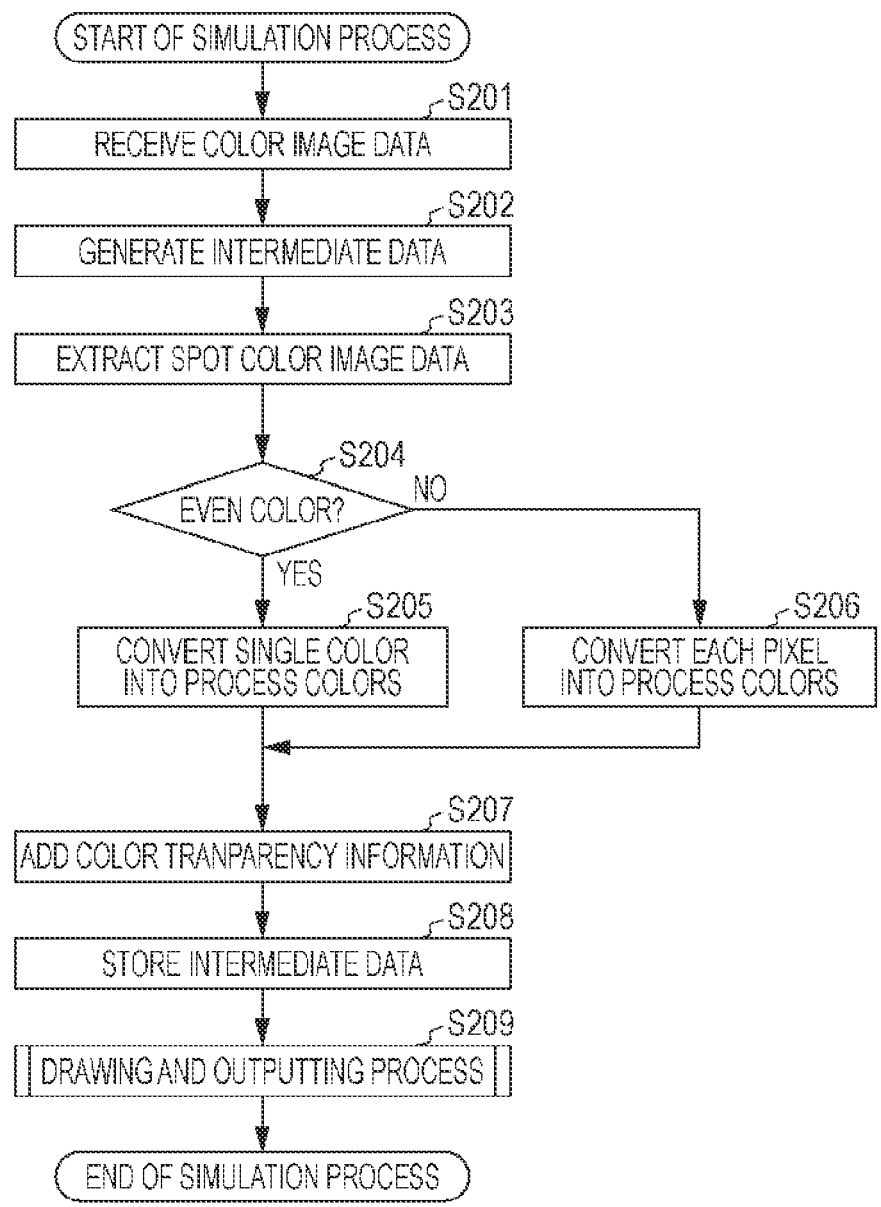
FIG. 7 is a flowchart illustrating a process for simulating color image data according to the exemplary embodiment of the present invention.

Next, the process for simulating the color image data using the process colors performed by the image processing apparatus 2 in step S104 will be described with reference to the flowchart illustrated in FIG. 7.

First, the reception section 21 receives the color image data transmitted from the terminal apparatus 1 via the network 4 (step S201).

Next, the intermediate data generation section 22 generates intermediate data including color information indicating the color of each image data on the basis of the color image data received by the reception section 21 (step S202).

Then, the spot color image data extraction section 23 extracts spot color image data from the intermediate data generated by the intermediate data generation section 22 (step S203).

Next, the color information conversion section 24 determines whether or not color information on the spot color image data extracted by the spot color image data extraction section 23 indicates an even color in the region indicated by the shape information (step S204).

Then, in the case where the color information on the spot color image data extracted by the spot color image data extraction section 23 indicates an even color in the region indicated by the shape information (Yes in step S204), the color information is converted such that only the single even color is represented by the process colors (step S205).

In the case where the color information on the spot color image data extracted by the spot color image data extraction section 23 indicates plural colors such as gradations in the region indicated by the shape information (No in step S204), meanwhile, the color information on the spot color image data is converted such that each pixel in the region indicated by the shape information on the spot color image data is represented by the process colors (step S206).

Then, the color transparency information addition section 25 adds the color transparency information specified by the terminal apparatus 1 to the color information on the spot color image data converted by the color information conversion section 24 (step S207).

Then, the storage section 26 stores, along with the intermediate data generated by the intermediate data generation section 22, the color information on the spot color image data which are converted by the color information conversion section 24 into color information represented by the process colors and to which the color transparency information has been added by the color transparency information addition section 25 as converted color information (step S208).

Then, the image processing apparatus 2 performs a drawing process and an outputting process on the basis of the intermediate data and the converted color information stored in the storage section 26 (step S209).

Figure 8:
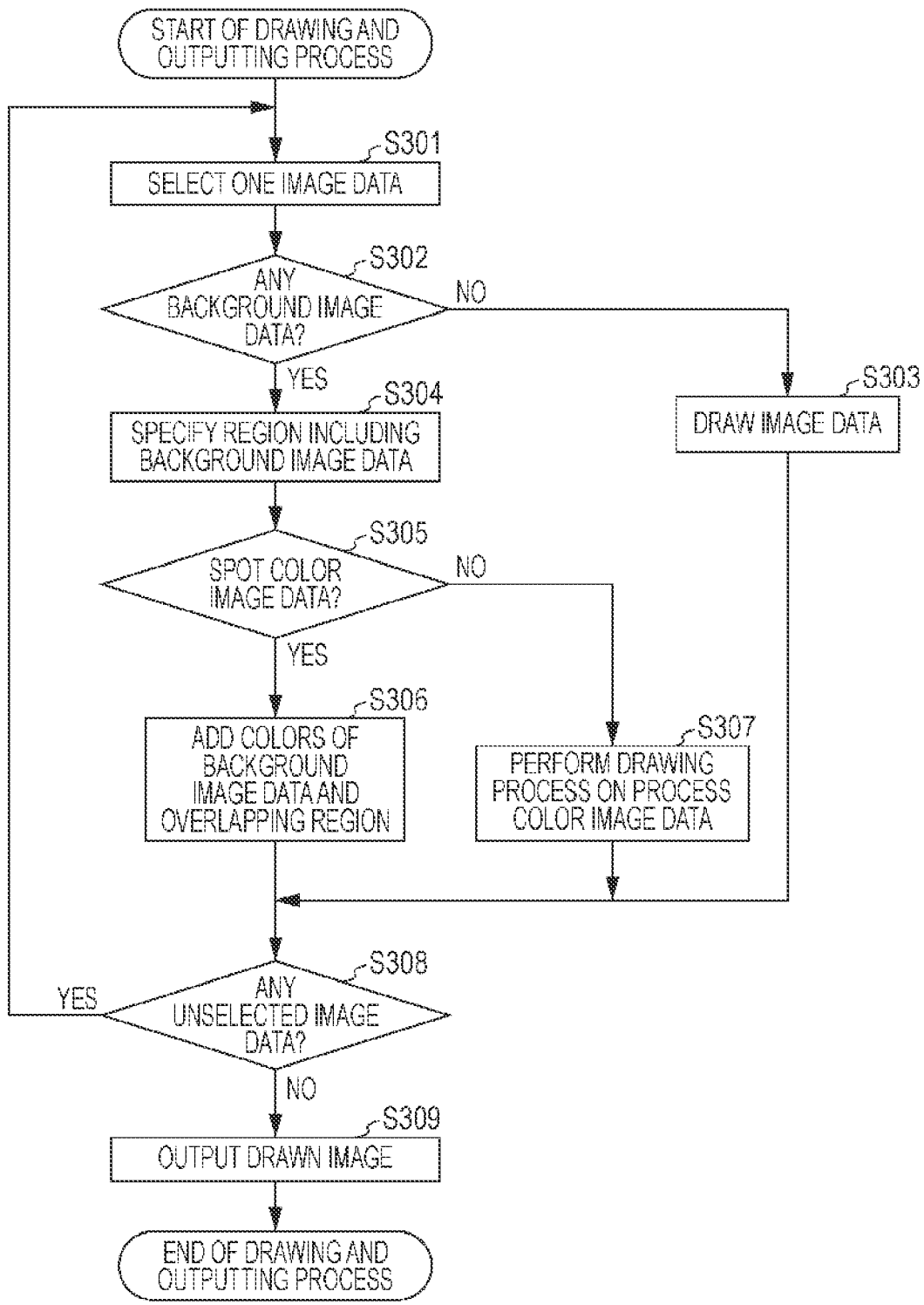
FIG. 8 is a flowchart illustrating a drawing and outputting process according to the exemplary embodiment of the present invention.

Next, the drawing process and the outputting process performed by the image processing apparatus 2 in step S209 will be described in detail with reference to FIG. 8.

First, the overlap determination section 27 selects one image data from the intermediate data stored in the storage section 26 (step S301).

Next, the overlap determination section 27 determines whether or not the selected image data have background image data (step S302). In the case where it is determined that the image data selected by the overlap determination section 27 do not have background image data (No in step S302), the drawing processing section 28 performs a drawing process on the basis of the color information and the shape information on the image data selected by the overlap determination section 27 (step S303), and the process proceeds to step S308.

In the case where it is determined that the image data selected by the overlap determination section 27 have background image data (Yes in step S302), meanwhile, the drawing processing section 28 specifies a region including the image data selected by the overlap determination section 27 and the background image data (step S304).

Next, the drawing processing section 28 determines whether or not the image data selected by the overlap determination section 27 are spot color image data (step S305).

Then, in the case where it is determined that the image data selected by the overlap determination section 27 are spot color image data (Yes in step S305), the drawing processing section 28 performs a drawing process for each pixel of the region including the spot color image data and the background image data so as to add the color of the spot color image data and the color of the background image data of the spot color image data in the region in which the spot color image data and the background image data overlap each other on the basis of the color information and the shape information on the spot color image data and the color information and the shape information on the background image data (step S306), and the process proceeds to step S308.

In the case where it is determined that the image data selected by the overlap determination section 27 are not spot color image data (No in step S305), meanwhile, the drawing processing section 28 determines that the image data are process color image data. Then, the drawing processing section 28 performs a drawing process for each pixel of the region including the process color image data and the background image data in accordance with whether or not overprinting is specified in the region in which the process color image data and the background image data overlap each other (step S307), and the process proceeds to step S308.

Then, the overlap determination section 27 determines whether or not there are any unselected image data in the intermediate data (step S308). Then, in the case where there are any unselected image data in the intermediate data (Yes in step S308), the processes described above are repeated from step S301.

In the case where there are not any unselected image data in the intermediate data (No in step S308), the output section 29 outputs the drawn image to a display device, paper, or the like (not illustrated).

A specific example of the color image data drawn in accordance with the process described above will be described with reference to FIGS. 9, 10, and 11.

First, the terminal apparatus 1 prepares color image data composed of a first spot color image, a second spot color image, a cyan image, and a magenta image as illustrated in FIG. 9. Then, the color image data are transmitted to the image processing apparatus 2 along with an instruction that specifies the color transparency information on the first spot color image as semi-transparent and the color transparency information on the second spot color image as non-transparent.

Then, the reception section 21 receives the color image data and the instruction specifying the color transparency information transmitted from the terminal apparatus 1. Next, the intermediate data generation section 22 generates intermediate data including color information and shape information on each image data on the basis of the received color image data. Then, the spot color image data extraction section 23 extracts the first spot color image and the second spot color image from the generated intermediate data.

Then, the color information conversion section 24 converts color information on the extracted first spot color image and color information on the extracted second spot color image into color information represented in the process colors as illustrated in FIG. 10.

Specifically, the color information conversion section 24 converts the color information such that the spot color indicated by the color information on the first spot color image is represented by cyan 90, magenta 114, yellow 140, and black 63. In addition, the color information conversion section 24 converts the color information such that the spot color indicated by the color information on the second spot color image is represented by cyan 60, magenta 160, yellow 70, and black 50.

Then, the color transparency information addition section 25 adds color transparency information as "semi-transparent" to the first spot color image and color transparency information as "non-transparent" to the second spot color image as illustrated in FIG. 10.

Then, the storage section 26 stores intermediate data including the color information, the color transparency information, and the shape information on the color image data.

Next, the overlap determination section 27 refers to the intermediate data stored in the storage section 26 to determine that the cyan image 52 is present in the background of the first spot color image 50, and determine that the magenta image 53 is present in the background of the second spot color image 51.

Then, the drawing processing section 28 first performs a drawing process for each pixel of the region including the first spot color image 50 and the cyan image 52. Since the color transparency information on the first spot color image 50 is semi-transparent, the region in which the first spot color image 50 and the cyan image 52 overlap each other is drawn such that the colors of the two images are added. Specifically, as illustrated in FIG. 11, a color with cyan 255, magenta 0, yellow 0, and black 0 is added to the color of the first spot color image 50 with cyan 90, magenta 114, yellow 140, and black 63 so that the color of the region in which the first spot color image 50 and the cyan image 52 overlap each other is a color with cyan 255, magenta 114, yellow 140, and black 63. The upper-limit value for each color is 255. In the case where the upper-limit value is exceeded, the exceeding portion will be discarded.

Next, the drawing processing section 28 performs a drawing process for each pixel of the region including the second spot color image 51 and the magenta image 53. Since the color transparency information on the second spot color image 51 is non-transparent, the region in which the second spot color image 51 and the magenta image 53 overlap each other is drawn such that the color of the magenta image 53 is hidden by the color of the second spot color image 51. Specifically, as illustrated in FIG. 11, the region in which the second spot color image 51 and the magenta image 53 is drawn using a color with cyan 60, magenta 160, yellow 70, and black 50, which is indicated by the color information on the second spot color image 51.

Then, the output section 29 outputs the image drawn as described above to a display device, paper, or the like (not illustrated).

In the exemplary embodiment, the process described above is performed by the image processing apparatus 2. However, the process described above may be performed by an image forming apparatus including the image processing apparatus 2.

In the exemplary embodiment, in addition, the terminal apparatus 1 specifies color transparency information. However, a server that keeps color transparency information set for each spot color may be provided, and the image processing apparatus 2 may refer to the server to add the color transparency information to the color information on the spot color image data.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a reception unit that receives color image data composed of process color image data, which are image data represented in process colors, and spot color image data, which are image data represented in spot colors that are different from the process colors;
   an intermediate data generation unit that generates intermediate data including color information indicating a color of each image data on the basis of the color image data received by the reception unit;
   an extraction unit that extracts spot color image data from the intermediate data generated by the intermediate data generation unit;
   a conversion unit that converts color information on the spot color image data extracted by the extraction unit into color information represented in the process colors;
   an addition unit that adds color transparency information indicating a proportion of a color to a color of image data in a background to the color information on the spot color image data converted by the conversion unit;
   a determination unit that determines whether or not the intermediate data generated by the intermediate data generation unit for each image data have background image data, which are other image data provided in the background to overlap the image data; and
   a drawing processing unit that performs a drawing process on the basis of the intermediate data, the color information on the spot color image data converted by the conversion unit, and the color transparency information added by the addition unit,
   wherein in the case where the determination unit determines that the intermediate data for spot color image data have background image data, the drawing processing unit performs a drawing process so as to add a color of the spot color image data and a color of the background image data of the spot color image data on the basis of the color transparency information added by the addition unit, the color information on the spot color image data converted by the conversion unit, and the color information on the background image data.

2. The image processing apparatus according to claim 1, wherein the color transparency information further includes information indicating a proportion of a color to a color of foreground image data, which are other image data provided in a foreground to overlap the image data.

3. The image processing apparatus according to claim 1, wherein in the case where the determination unit determines that the intermediate data for image data have background image data and a drawing process is performed on such image data, the drawing processing unit performs a drawing process for each pixel of a region including the image data and the background image data.

4. The image processing apparatus according to claim 1, wherein the intermediate data further include shape information indicating a region decided by a shape of each image data in the color image data, and
in the case where the color information on the spot color image data indicates an even color in the region indicated by the shape information, the conversion unit converts the color information on the spot color image data such that the even color is represented by the process colors, and in the case where the color information on the spot color image data indicates a plurality of colors in the region indicated by the shape information, the conversion unit converts the color information on the spot color image data such that each pixel in the region indicated by the shape information on the spot color image data is represented by the process colors.

5. An image forming apparatus comprising:
   a reception unit that receives color image data composed of process color image data, which are image data represented in process colors, and spot color image data, which are image data represented in spot colors that are different from the process colors;
   an intermediate data generation unit that generates intermediate data including color information indicating a color of each image data on the basis of the color image data received by the reception unit;
   an extraction unit that extracts spot color image data from the intermediate data generated by the intermediate data generation unit;
   a conversion unit that converts color information on the spot color image data extracted by the extraction unit into color information represented in the process colors;
   an addition unit that adds color transparency information indicating a proportion of a color to a color of image data in a background to the color information on the spot color image data converted by the conversion unit;
   a determination unit that determines whether or not the intermediate data generated by the intermediate data generation unit for each image data have background image data, which are other image data provided in the background to overlap the image data; and
   a drawing processing unit that performs a drawing process on the basis of the intermediate data, the color information on the spot color image data converted by the conversion unit, and the color transparency information added by the addition unit; and an output unit that outputs an image on which the drawing process has been performed by the drawing processing unit, wherein in the case where the determination unit determines that the intermediate data for spot color image data have background image data, the drawing processing unit performs a drawing process so as to add a color of the spot color image data and a color of the background image data of the spot color image data on the basis of the color transparency information added by the addition unit, the color information on the spot color image data converted by the conversion unit, and the color information on the background image data.

6. A non-transitory computer readable medium storing a program causing a computer to execute a process comprising:

receiving color image data composed of process color image data, which are image data represented in process colors, and spot color image data, which are image data represented in spot colors that are different from the process colors;

generating intermediate data including color information indicating a color of each image data on the basis of the received color image data;

extracting spot color image data from the generated intermediate data;

converting color information on the extracted spot color image data into color information represented in the process colors;

adding color transparency information indicating a proportion of a color to a color of image data in a background to the converted color information on the spot color image data; and determining whether or not the generated intermediate data for each image data have background image data, which are other image data provided in the background to overlap the image data; and in the case where it is determined that the intermediate data for spot color image data have background image data, a drawing process is performed so as to add a color of the spot color image data and a color of the background image data of the spot color image data on the basis of the added color transparency information, the converted color information on the spot color image data, and the color information on the background image data.

\* \* \* \* \*